United States Patent
Rowe et al.

[11] Patent Number: 6,124,659
[45] Date of Patent: Sep. 26, 2000

[54] STATOR WEDGE HAVING ABRASION-RESISTANT EDGE AND METHODS OF FORMING SAME

[75] Inventors: Charles M. Rowe, Orlando; Lorenzo E. Ramirez Coronel, Oviedo, both of Fla.

[73] Assignee: Siemens Westinghouse Power Corporation, Orlando, Fla.

[21] Appl. No.: 09/378,387

[22] Filed: Aug. 20, 1999

[51] Int. Cl.[7] .................................................. H02K 3/48
[52] U.S. Cl. .............................. 310/214; 310/254; 29/546
[58] Field of Search ..................... 310/214, 254; 29/596

[56] References Cited

U.S. PATENT DOCUMENTS

| | | | |
|---|---|---|---|
| 984,182 | 2/1911 | Barr | 310/214 |
| 2,710,931 | 6/1955 | Tittel et al. | 428/546 |
| 2,723,358 | 11/1955 | Holmgren | 310/214 |
| 2,922,058 | 1/1960 | Bacon | 310/214 |
| 3,391,294 | 7/1968 | Moxie | 310/214 |
| 3,437,858 | 4/1969 | White | 310/214 |
| 3,594,597 | 7/1971 | Kildishev et al. | 310/214 |
| 3,624,432 | 11/1971 | Merz | 310/53 |
| 3,780,325 | 12/1973 | Frankenhauser | 310/214 |
| 3,909,931 | 10/1975 | Lambrecth | 29/596 |
| 4,200,818 | 4/1980 | Ruffing et al. | 310/214 |
| 4,369,389 | 1/1983 | Lambrecht | 310/214 |
| 4,385,252 | 5/1983 | Butman, Jr. et al. | 310/214 |
| 4,572,980 | 2/1986 | Anderson et al. | 310/214 |
| 4,607,183 | 8/1986 | Rieber et al. | 310/214 |
| 5,365,135 | 11/1994 | Konrad et al. | 310/214 |

*Primary Examiner*—Elvin Enad
*Assistant Examiner*—Joseph Waks

[57] ABSTRACT

A stator wedge (30) to position in a coil slot (40) for retaining coils (40) of a stator of a power generator and methods of forming the wedge (30) are provided. The stator wedge (30) preferably includes an elongate, non-conductive, and substantially rigid body member (36). The body member (36) preferably includes a relatively flat bottom surface (35) and a relatively flat top surface (33). The top surface (33) preferably has less surface area than the bottom surface (35). The body member (36) also includes at least a pair of side peripheries sloping upwardly from peripheries of the bottom surface (35) having a greater surface area to peripheries of the top surface (33) having a lesser surface area to thereby define at least a pair of angled sides (31, 37). A thin-film, abrasion-resistant, non-conductive coating layer (32) is formed on upper surfaces of at least the pair of angled sides (31, 37).

20 Claims, 3 Drawing Sheets

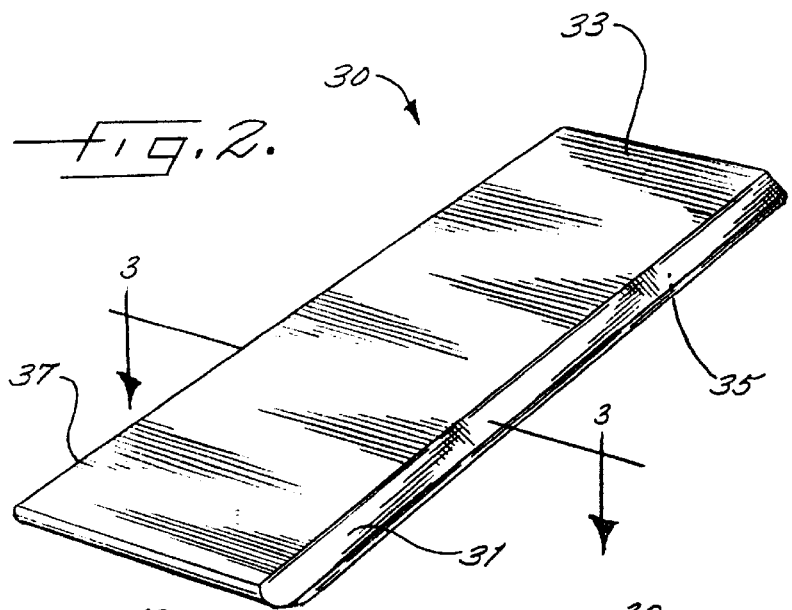
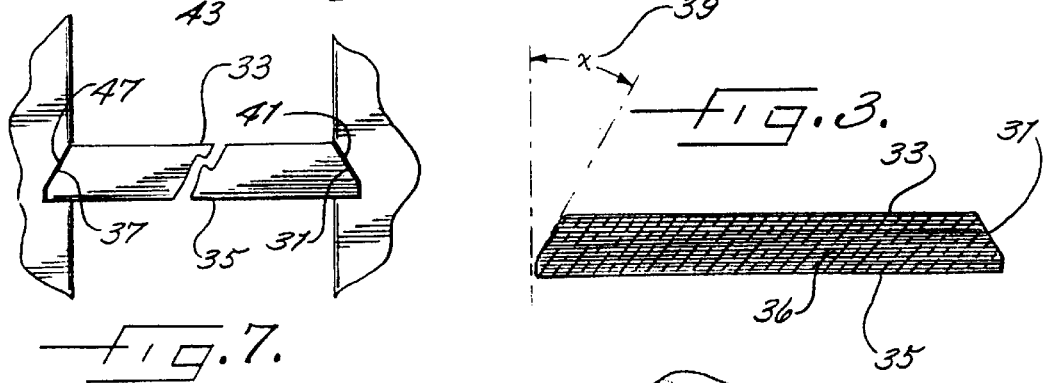
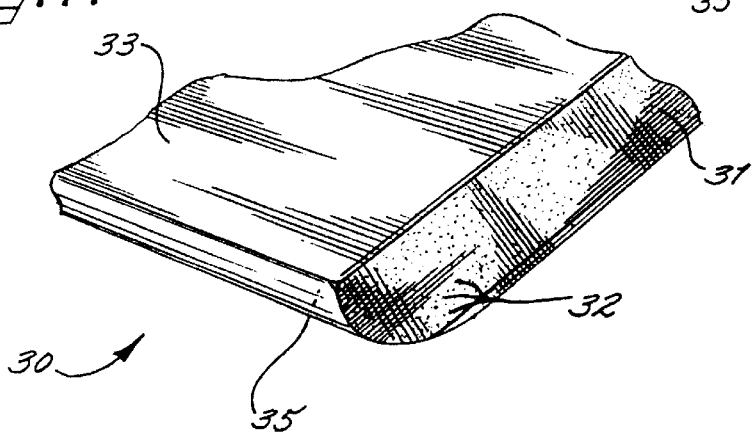

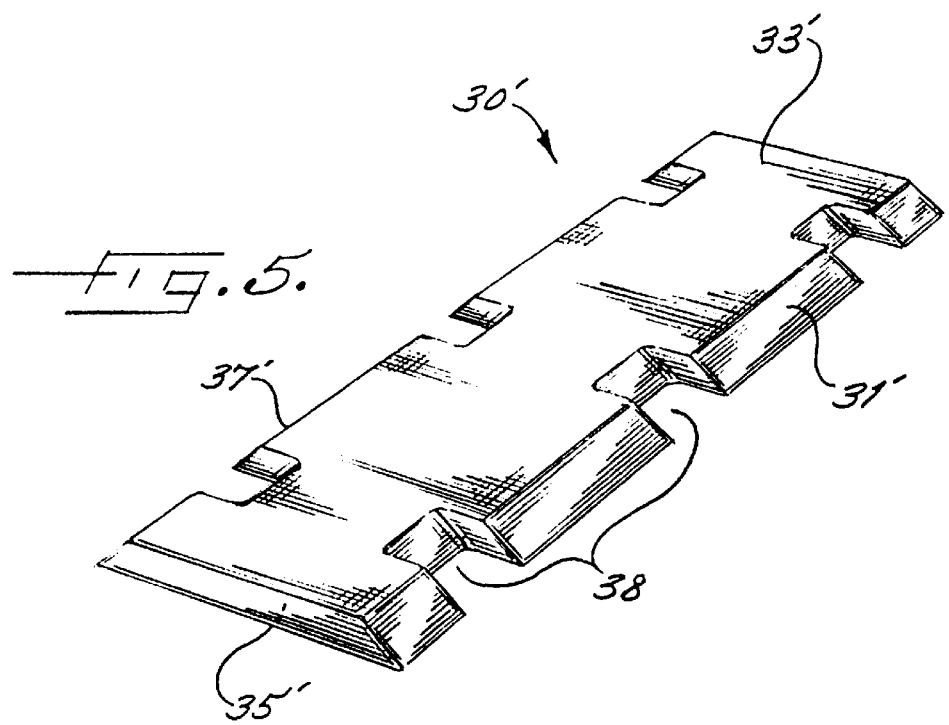
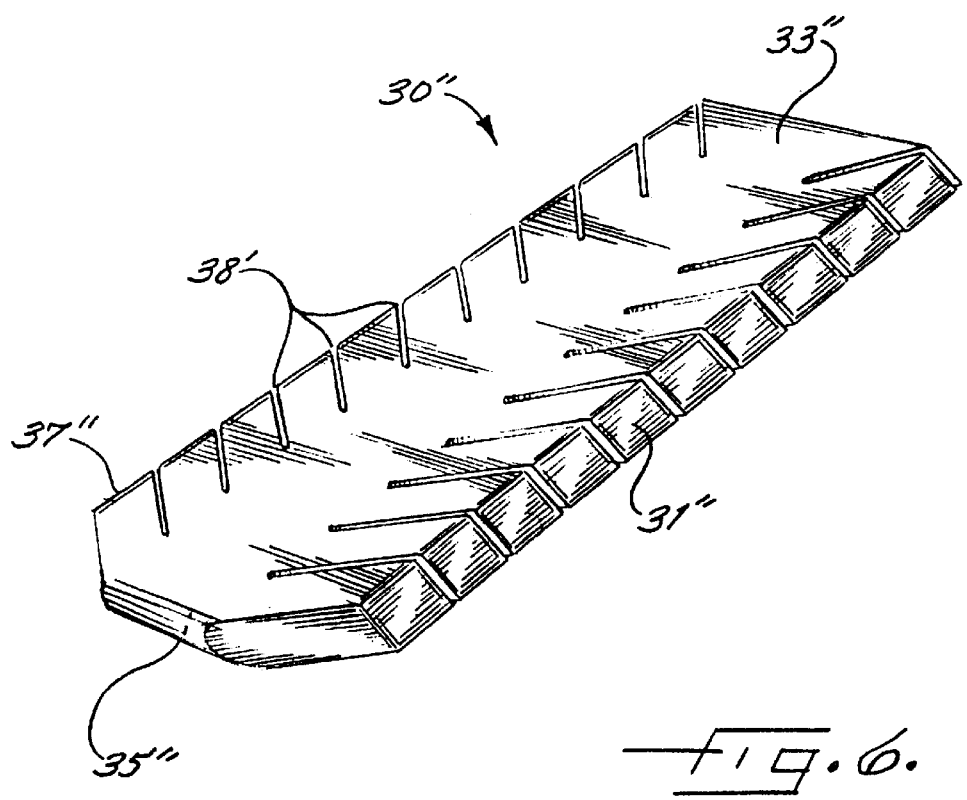

STATOR WEDGE HAVING ABRASION-RESISTANT EDGE AND METHODS OF FORMING SAME

FIELD OF THE INVENTION

This invention is related to the power generation industry and, more particularly, to the field of electrical power generators and motors.

BACKGROUND OF THE INVENTION

In the power generation industry, hundreds of stator wedges are often used to assist in retaining coils in a stator of a power generator or a motor. Coils are positioned within cavities, slots, or spaces in the core laminations, and the stator wedges are positioned to overlie the coils. The stator wedges are positioned into wedge grooves or wedge slots formed in the peripheries of the core laminations within the coil slots. The laminations are conventionally formed of coated steel material. The stator wedges are conventionally formed of an epoxy-laminated glass material. Because the stator core laminations are formed of a coated steel material, it is important that such wedges be formed of a non-conductive material so that a short is not created which can damage various portions of the generator. Also, a problem with these conventional stator wedges is that the wedges damage the stator iron during installation of the wedge, and after installation, the wedges damage the laminations such as from vibrations which occur during operation of the generator. Although some of these wedges can be slid into position, many are driven into a slot by force. Accordingly, it is also important that these wedges have structural strength so as to withstand such installation or replacement driving force and properly retain the coils in position.

To solve these damage problems, stator wedges have been formed of a glass material having a facing layer of aromatic polyamide mat or Kevlar or natural fibers such as cotton material. Examples of such wedges are shown in U.S. Pat. No. 4,200,818 by Ruffing et al. titled "Resin Impregnated Aromatic Polyamide Covered Glass Based Slot Wedge For Large Dynamoelectric Machines" and U.S. Pat. No. 4,607,183 by Rieber et al. titled "Dynamoelectric Machine Slot Wedges With Abrasion Resistant Layer." These wedges are often molded so that the glass and mat material are bonded together to form a single wedge unit. Although these wedges generally perform well, these wedges can be difficult, costly, and take extensive time to manufacture.

SUMMARY OF THE INVENTION

In view of the foregoing, the present invention advantageously provides a stator wedge and methods of forming the same which is relatively easy, less expensive, and takes substantially less time to manufacture. The present invention also advantageously provides a structurally strong stator wedge and method of installing a stator wedge so that the stator wedge can be driven into position in core laminations to retain stator coils in position within stator coil slots and so that the stator wedge and the installation of the same substantially reduces damage to the stator iron during installation and to the core laminations during operation. The present invention further advantageously provides a non-conductive stator wedge which has substantially abrasion-resistant and corrosion-resistant surfaces so that the stator lamination are less susceptible to damage from the wedge during operation.

More particularly, the present invention advantageously provides a stator wedge to position in a coil slot for retaining coils of a stator of a power generator. The stator wedge preferably has an elongate, non-conductive, and substantially rigid body member. The body member preferably includes a relatively flat bottom surface and a relatively flat top surface. The top surface has less surface area than the bottom surface. The body member also includes at least a pair of side peripheries sloping upwardly from peripheries of the bottom surface having a greater surface area to peripheries of the top surface having a lesser surface area to thereby define at least a pair of angled sides. The body member further includes a thin-film, abrasion-resistant, non-conductive coating layer formed on upper surfaces of at least the pair of angled sides.

The present invention also provides a stator wedging system for a power generator. The system preferably includes a plurality of core laminations formed of a metal, at least one coil slot formed in the plurality of core laminations, at least a pair of wedge grooves each positioned on an opposing side wall periphery of the coil slot, at least one coil positioned in the coil slot, and a stator wedge positioned in the wedge grooves of the coil slot to retain the coils within the coil slot during operation of the power generator. The stator wedge preferably includes a non-conductive and substantially rigid body member. The body member preferably has at least a pair of side peripheries sloping upwardly from peripheries of a bottom surface to peripheries of a top surface to thereby define at least a pair of angled sides. The body member also has a thin-film, abrasion-resistant, non-conductive coating layer formed on upper surfaces of at least the pair of angled sides. The coating layer preferably abuttingly contacts the outer surface of the pair of wedge grooves.

The present invention additionally provides a method of forming a stator wedge. The method preferably includes forming an elongate, non-conductive, and substantially rigid body member of an epoxy-laminated glass material. The body member preferably has a relatively flat bottom surface and a relatively flat top surface. The method also includes forming a pair of angled sides in the body member so that the top surface has less surface area than the bottom surface. The pair of angled sides is preferably defined by at least a pair of side peripheries of the body member sloping upwardly from peripheries of the bottom surface to peripheries of the top surface. The method further includes coating a thin-film, abrasion-resistant, non-conductive layer formed onto upper surfaces of at least the pair of angled sides.

The present invention further provides a method of retaining stator coils within a stator coil slot of a stator of a power generator. The method preferably includes providing a plurality of core laminations formed of a metal material, at least one coil slot formed in the plurality of core laminations, at least a pair of wedge grooves each positioned on an opposing side wall periphery of the coil slot, and at least one coil positioned in the coil slot. The method also includes driving a stator wedge into the wedge grooves of the coil slot to retain the coils within the coil slot when the power generator is operating. The stator wedge preferably includes an elongate, non-conductive, and substantially rigid body member. The body member includes at least a pair of side peripheries sloping upwardly from peripheries of a bottom surface to peripheries of a top surface to thereby define at least a pair of angled sides. The body member also includes a thin-film, abrasion-resistant, non-conductive coating layer formed on upper surfaces of at least the pair of angled sides. The coating layer preferably abuttingly contacts the outer surface of the pair of wedge grooves.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a perspective view of a stator wedge with an abrasion resistant edge according to the present invention;

FIG. 3 is a sectional view of a stator wedge with an abrasion resistant edge taken along line 3—3 of FIG. 2 according to the present invention;

FIG. 4 is an enlarged fragmentary perspective view of a stator wedge illustrating the forming of a coating layer using powder coating technology according to the present invention;

FIG. 5 is a perspective view of another embodiment of a stator wedge having an abrasion resistant edge according to the present invention;

FIG. 6 is a perspective view of yet another embodiment of a stator wedge having an abrasion resistant edge according to the present invention; and FIG. 7 is a fragmentary front elevational view of a stator wedge having abrasion resistant edges and matingly positioned into wedge grooves of peripheries of a stator coil slot of core laminations according to the present invention.

DETAILED DESCRIPTION OF PREFERRED EMBODIMENTS

Figure 1:
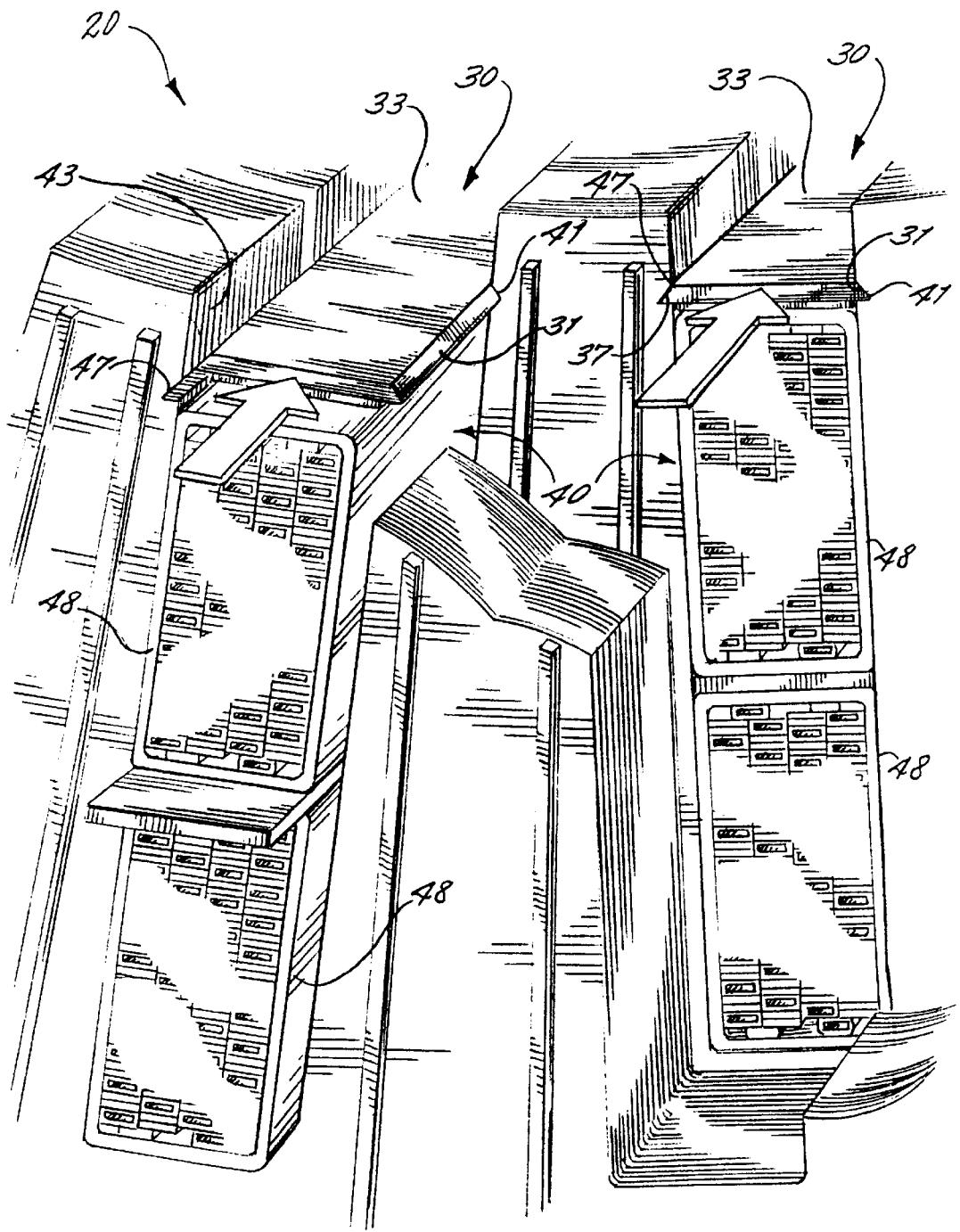
FIG. 1 is a perspective view of a stator wedging system having a stator wedge with an abrasion-resistant edge according to the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

FIG. 1 illustrates a stator wedge 30 positioned in a coil slot 40 of core laminations 43 for retaining coils 48 of a stator of a power generator within the coil slot 40 when the power generator is operating. As illustrated a stator wedging system 20 preferably includes a plurality of core laminations 43 formed of a metal material, e.g., coated steel, at least one coil slot 40 formed in the plurality of core laminations 43, at least a pair of wedge grooves 41, 47 each positioned on an opposing side wall periphery of the coil slot 40, at least one coil 48 positioned in the coil slot 40, and a stator wedge 30 positioned in the wedge grooves 41, 47 of the coil slot 40 to retain the coils 48 within the coil slot 40 during operation of the power generator (see also FIG. 7). The wedge grooves 41, 47 preferably have a shape as illustrated, e.g., a dovetail, or other shape which matingly receives the opposing shape of the edges of the stator wedge 30.

As perhaps best illustrated in FIGS. 2–3, the stator wedge 30 preferably has an elongate, non-conductive; and substantially rigid body member 36, e.g., preferably formed of an epoxy-laminated glass material or melamine material as a base or core of the body member. The rigidity of the material is important because the wedge 30 is driven downwardly into position in many applications and should be able to withstand the force, e.g., pounding force, required to drive the wedge 30 into position without any or very little damage to the stator iron or stator core laminations 43. The body member 36 of the invention is also preferably formed of a material which causes abrasions to the core laminations such as glass or melamine materials. The body member 36 preferably includes a relatively flat bottom surface 35 and a relatively flat top surface 33. As illustrated, the top surface 33 preferably has less surface area than the bottom surface 35. The body member 36 also includes at least a pair of side peripheries sloping upwardly from peripheries of the bottom surface 35 having a greater surface area to peripheries of the top surface 33 having a lesser surface area to thereby define at least a pair of angled sides 31, 37. The body member 36 further includes a thin-film, abrasion-resistant, non-conductive coating layer 32 formed on upper surfaces of at least the pair of angled sides 31, 37. By the use of a thin film, e.g., preferably less than 0.003 inches and more preferably between 0.0005 inches and 0.003 inches, the invention is particularly distinctly different than mat material which typically has a much larger thickness. These pair of angled sides 31, 37 with the coating layer 32 thereon, in essence, forms the abrasion resistant edges of the wedge 30. The coating layer 32 is preferably formed using powder coating technology as understood by those skilled in the art (see FIG. 4). For example, the powder is preferably charged, e.g., positive or negative, and the rigid body member is oppositely charged, e.g., negative or positive, and the powder is then baked onto the body member 36. Other techniques can also be used as well as understood by those skilled in the art to form the thin-film, coating layer. For example, a fluidized bed wherein the body member 36 is heated, dipped into a bed of the thin-film coating material, and then the coating material is baked onto the desired angled surfaces. The coating layer 32, as well as other portions of the body member 36, are preferably formed of non-conductive materials so that the wedge 30 does not cause a short due to the core laminations 43 being formed of a metal material.

The bottom surface 35 of the stator wedge and the upward sloping from peripheries of the bottom surface 35 to peripheries of the top surface 33 of the angled sides preferably define a predetermined angle 39 (see x at FIG. 3). Notably, this angle can either directly arise from the bottom surface 35 or a much smaller side periphery (as illustrated) can extend substantially perpendicular to the bottom surface 35 for a short distance prior to angling or sloping inwardly toward the top surface 33. The much smaller side periphery can also slope or angle outwardly and then slope inwardly and upwardly at the predetermined angle according to the present invention as well. The predetermined angle 39 is preferably in the range of 45 degrees to 75 degrees, and more preferably substantially 60 degrees (see FIGS. 2–3). The coating layer 32 is preferably corrosion resistant, non-fiberous, non-mat material and formed of at least one of the following: a Teflon material, e.g., a Teflon non-stick thermoset, a polymeric material, e.g., an epoxy thermoset paint, and a ceramic material. Depending on the desired material and the desired manufacturing, the coating layer 32 can also advantageously be a partial sacrificial layer if desired. As a sacrificial layer, portions of the coating layer 32 can be destroyed, removed, or damaged while other portions still protect the core laminations 43 from damage from the abrasive material of the body member 36.

In addition to desiring a much thinner material, another reason that a non-mat coating layer 32 is desirable is that mats are often molded onto or embedded into another material which may result in at least initially high manufacturing costs, e.g., purchasing and forming the molds, but the quantities of wedges desired to be produced is only about 500–2000 per generator. These relatively small volumes for molds, in turn, greatly increase the per unit cost of each of the stator wedges 30 produced thereby. In contrast, the stator wedge 30 of the present invention advantageously allows the coating layer 32 to be applied to selected surfaces of preformed or cut material so that the unit costs are lower and the manufacturing lead times can be reduced.

In alternative embodiments as best illustrated in FIGS. 5–6, the at least a pair of angled sides 31', 31", 37', 37" of the body member 36' can advantageously include a plurality of spaced-apart slots 38, 38' formed in each of the pair of angled sides 31', 31", 37', 37". The plurality of slots 38, 38' of each side 31', 31", 37', 37" are preferably spaced-apart substantially the same distance from at least one other of the plurality of slots 38, 38'. Because only the angled sides 31', 31", 37', 37" abuttingly contacting the wedge grooves 41, 47 could cause damage to the stator iron or core laminations 43, the coating layer 32 is preferably only formed on the angled sides 31', 31", 37', 37" and not the sides within the slots 38, 38' themselves of these embodiments.

As illustrated in FIGS. 1–7, the present invention additionally provides a method of forming a stator wedge 30. The method preferably includes forming an elongate, non-conductive, and substantially rigid body member 36 of an abrasive material, e.g., an epoxy-laminated glass material. The step of forming the rigid body member 36 preferably includes depositing and pressing glass material and resin into a glass block shape, e.g., 48-inches by 48inches, as understood by those skilled in the art. The glass block is then preferably machined, e.g., using a diamond cutter or a carbide, into smaller portions of glass having the desired shaped as also understood by those skilled in the art. The body member 36 preferably has a relatively flat bottom surface 35 and a relatively flat top surface 33. The method also includes forming a pair of angled sides 31, 37 in the body member 36 so that the top surface 33 has less surface area than the bottom surface 35. The pair of angled sides 31, 37 is preferably defined by at least a pair of side peripheries of the body member 36 sloping upwardly from peripheries of the bottom surface 35 to peripheries of the top surface 33 as illustrated. The method further includes coating a thin-film, abrasion-resistant, non-conductive layer 32 onto upper surfaces of at least the pair of angled sides 31, 37. The coating step preferably includes charging a powder of the thin film material so as to have a first polarity, charging the body member 36 with a second opposite polarity, applying the powder of the thin film material onto the pair of angle sides 31, 37, and heating or baking the combination so as to cure the powder onto the surfaces of the angled sides and thereby form the coating layer 32. The method can also include providing a stator wedge 30 having the various features and elements of the stator wedge 30 as described above herein.

The present invention further provides a method of retaining stator coils 48 within a stator coil slot 40 of a stator of a power generator (see FIGS. 1–6). The method preferably includes providing a plurality of core laminations 43 formed of a metal material, at least one coil slot 48 formed in the plurality of core laminations 43, at least a pair of wedge grooves 41, 47 each positioned on an opposing side wall periphery of the coil slot 40, and at least one coil 48 positioned in the coil slot 40. The method also includes driving a stator wedge 30 into the wedge grooves 41, 47 of the coil slot 40 to retain the coils 48 within the coil slot 40 during operation of the power generator. The stator wedge 30 preferably includes an elongate, non-conductive, and substantially rigid body member 36. The body member 36 includes at least a pair of side peripheries sloping upwardly from peripheries of a bottom surface 35 to peripheries of a top surface 33 to thereby define at least a pair of angled sides 31, 37. The body member 36 also includes a thin-film, abrasion-resistant, non-conductive coating layer 32 formed on upper surfaces of at least the pair of angled sides 31, 37. The coating layer 32 preferably abuttingly contacts the outer surface of the pair of wedge grooves 41, 47 to thereby protect the core laminations 43, e.g., the wedge grooves 41, 47, from the abrasive and rigid body member 36. The method can also include providing a stator wedge 30 having the various features and elements of the stator wedge 30 as described above herein.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A stator wedge to position in a coil slot for retaining coils of a stator of a power generator, the stator wedge comprising:

an elongate, non-conductive, and substantially rigid body member, the body member including a relatively flat bottom surface and a relatively flat top surface, the top surface having less surface area than the bottom surface, the body member also including at least a pair of side peripheries sloping upwardly from peripheries of the bottom surface having a greater surface area to peripheries of the top surface having a lesser surface area to thereby define at least a pair of angled sides, the body member further including a thin-film, abrasion-resistant, non-conductive coating layer formed on upper surfaces of at least the pair of angled sides.

2. A stator wedge as defined in claim 1, wherein the bottom surface and the upward sloping from peripheries of the bottom surface to peripheries of the top surface of the angled sides define a predetermined angle, the predetermined angle being in the range of 45 degrees to 75 degrees.

3. A stator wedge as defined in claim 2, wherein the predetermined angle is substantially 60 degrees.

4. A stator wedge as defined in claim 2, wherein the body member is formed of an abrasive material, and wherein the coating layer is corrosion resistant, non-fiberous, non-mat material and formed of at least one of the following: a Teflon material, a polymeric material, and a ceramic material.

5. A stator wedge as defined in claim 4, wherein the body member is formed of an epoxy-laminated glass material, and wherein the coating layer is corrosion resistant and formed of at least one of the following: a Teflon non-stick thermoset and an epoxy thermoset paint.

6. A stator wedge as defined in claim 1, wherein the at least a pair of angled sides of the body member include a plurality of spaced-apart slots formed in each of the pair of angled sides.

7. A stator wedge as defined in claim 6, wherein the plurality of slots of each side are spaced-apart substantially the same distance from at least one other of the plurality of slots.

8. A stator wedging system for a power generator, the system comprising:

a plurality of core laminations formed of a metal material;

at least one coil slot formed in the plurality of core laminations;

at least a pair of wedge grooves each positioned on an opposing side wall periphery of the coil slot;

at least one coil positioned in the coil slot; and a stator wedge positioned in the wedge grooves of the coil slot to retain the coils within the coil slot during operation of the power generator, the stator wedge including an elongate, non-conductive, and substantially rigid body member, the body member including at least a pair of side peripheries sloping upwardly from peripheries of a bottom surface to peripheries of a top surface to thereby define at least a pair of angled sides, and a thin-film, abrasion-resistant, non-conductive coating layer formed on upper surfaces of at least the pair of angled sides, the coating layer abuttingly contacting the outer surface of the pair of wedge grooves.

9. A stator wedging system as defined in claim 8, wherein the bottom surface and the upward sloping from peripheries of the bottom surface to peripheries of the top surface of the angled sides define a predetermined angle, the predetermined angle being in the range of 45 degrees to 75 degrees, and wherein each of the pair of wedge grooves have a mating shape for the predetermined angle of each of the pair of angled sides.

10. A stator wedging system as defined in claim 9, wherein the predetermined angle is substantially 60 degrees.

11. A stator wedging system as defined in claim 9, wherein the body member is formed of an abrasive material, and wherein the coating layer is corrosion resistant, non-fiberous, non-mat material and formed of at least one of the following: a Teflon material, a polymeric material, and a ceramic material.

12. A stator wedging system as defined in claim 11, wherein the body member is formed of an epoxy-laminated glass material, and wherein the coating layer is corrosion resistant and formed of at least one of the following: a Teflon non-stick thermoset and an epoxy thermoset paint.

13. A stator wedging system as defined in claim 8, wherein the at least a pair of angled sides of the body member include a plurality of spaced-apart slots formed in each of the pair of angled sides.

14. A stator wedging system as defined in claim 13, wherein the plurality of slots of each side are spaced-apart substantially the same distance from at least one other of the plurality of slots.

15. A method of retaining stator coils within a stator coil slot of a stator of a power generator, the method comprising:

providing a plurality of core laminations formed of a metal material, at least one coil slot formed in the plurality of core laminations, at least a pair of wedge grooves each positioned on an opposing side wall periphery of the coil slot, and at least one coil positioned in the coil slot; and driving a stator wedge into the wedge grooves of the coil slot to retain the coils within the coil slot when the power generator is operating, the stator wedge including an elongate, non-conductive, and substantially rigid body member formed of an abrasive material, the body member including at least a pair of side peripheries sloping upwardly from peripheries of a bottom surface to peripheries of a top surface to thereby define at least a pair of angled sides, and a thin-film, abrasion-resistant, non-conductive coating layer formed on upper surfaces of at least the pair of angled sides, the coating layer abuttingly contacting the outer surface of the pair of wedge grooves.

16. A method as defined in claim 15, wherein the bottom surface and the upward sloping from peripheries of the bottom surface to peripheries of the top surface of the angled sides define a predetermined angle, the predetermined angle being in the range of 45 degrees to 75 degrees, and wherein each of the pair of wedge grooves have a mating shape for the predetermined angle of each of the pair of angled sides.

17. A method as defined in claim 16, wherein the predetermined angle is substantially 60 degrees.

18. A method as defined in claim 17, wherein the coating layer is corrosion resistant, non-fiberous, non-mat material and formed of at least one of the following: a Teflon material, a polymeric material, and a ceramic material.

19. A method as defined in claim 18, wherein the coating layer is corrosion resistant and formed of at least one of the following: a Teflon, non-stick thermoset and an epoxy thermoset paint.

20. A method as defined in claim 19, wherein the at least a pair of angled sides of the body member include a plurality of spaced-apart slots formed in each of the pair of angled sides.

* * * * *